UNITED STATES PATENT OFFICE.

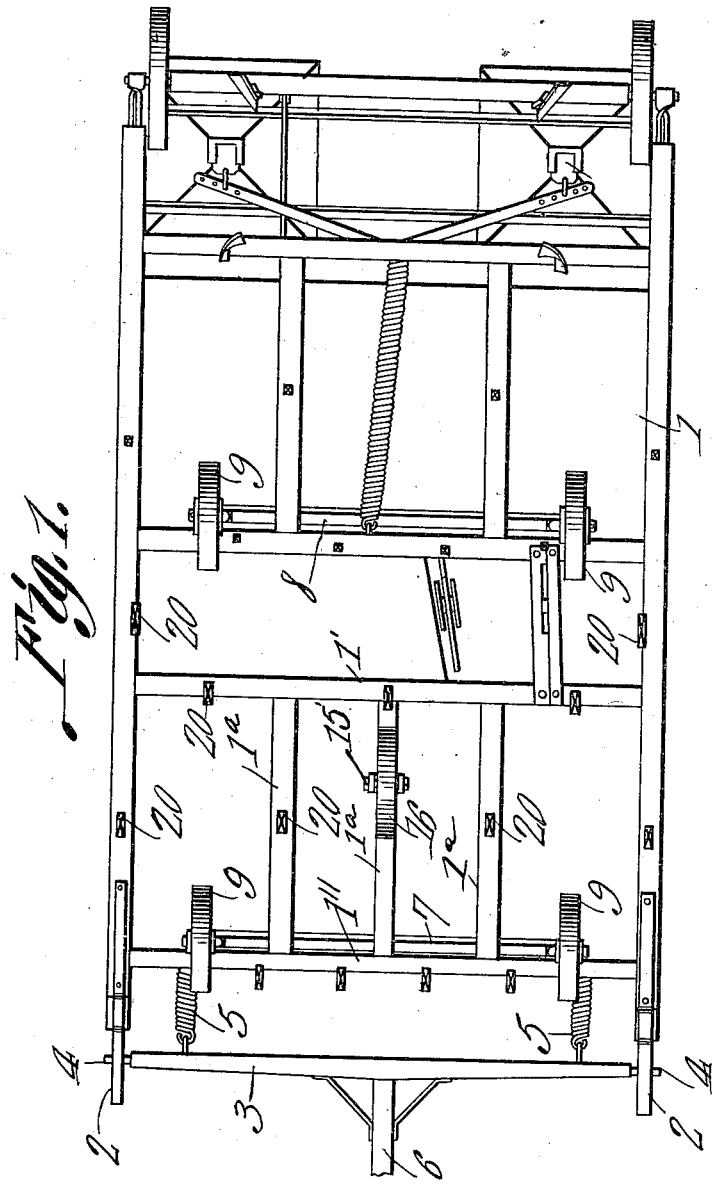

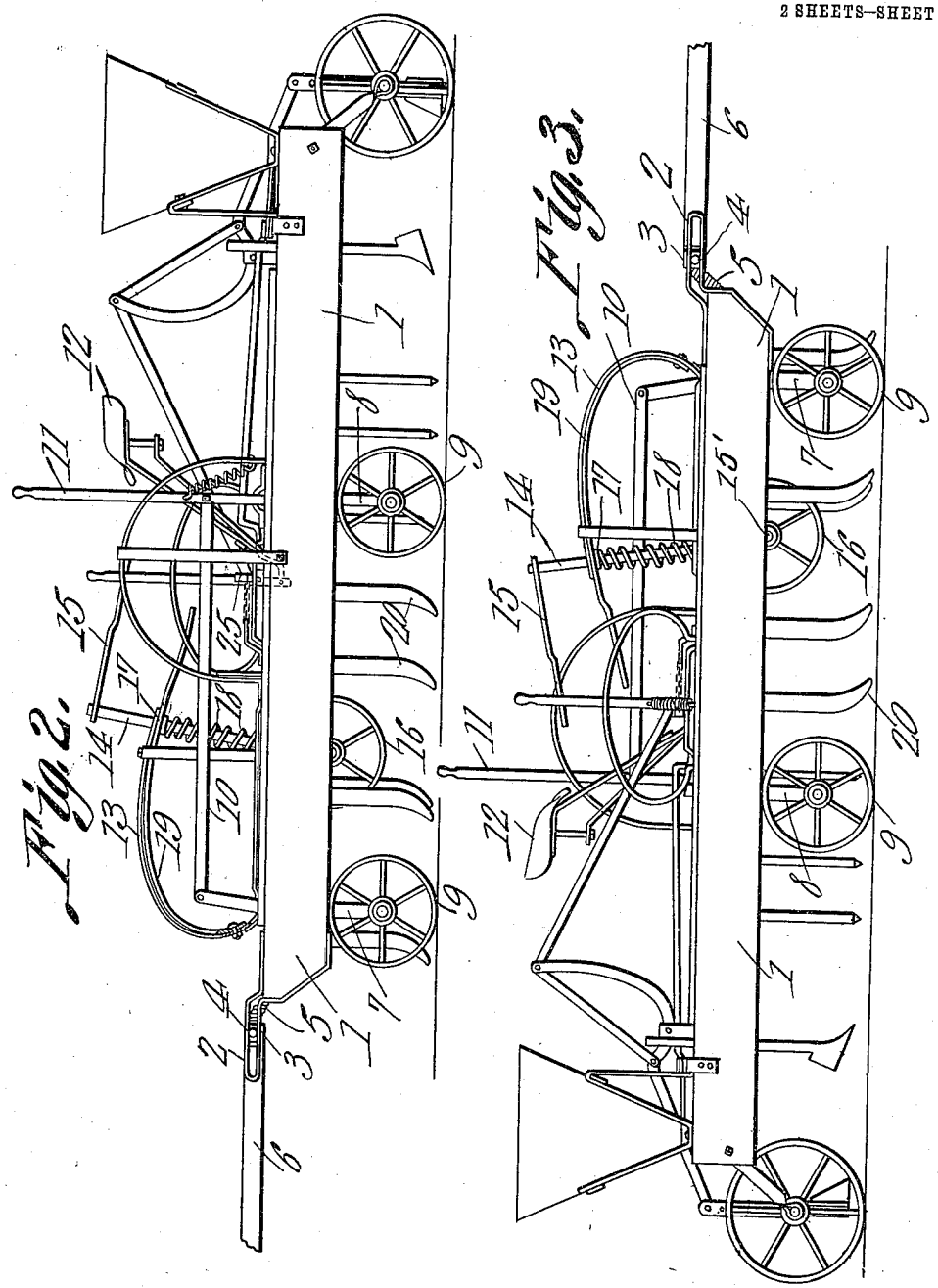

GEORGE ROSEMAN, OF DOLLAR BAY, MICHIGAN.

AGRICULTURAL MACHINE.

1,006,880.      Specification of Letters Patent.      Patented Oct. 24, 1911.

Application filed May 23, 1910. Serial No. 562,902.

*To all whom it may concern:*

Be it known that I, GEORGE ROSEMAN, a subject of the Emperor of Austria-Hungary, residing at Dollar Bay, in the county of Houghton and State of Michigan, have invented a new and useful Agricultural Machine, of which the following is a specification.

This invention relates to improvements in agricultural machines, and the primary object of the invention is the provision of a spring returned and foot operated steering or guiding means to be used in conjunction with an agricultural machine, such as a planter or cultivator, and which is supported upon wheels, said steering means being so disposed as to be normally held out of engagement with the earth and to be movably placed in contact therewith when it is desired to steer the machine out of a straight path.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings:—Figure 1 is a bottom plan view of the machine with this improvement mounted thereon. Fig. 2 is a side elevation of the said machine having this improvement in operative relation and out of contact with the ground. Fig. 3 is a view taken from the opposite side of the machine.

Referring to the drawings, the numeral 1 designates the main frame of a planter and cultivator which consists of the two parallel transverse beams 1', the forward transverse beam 1'', and the three longitudinally disposed beams 1ª, which are connected to the beam 1'' and the forward beam 1', said frame having usual draft devices 2, 3 and 4, and equalizing springs 5. This frame is adapted to be mounted at its forward end upon the four wheels 9, which remain in the same parallel relative position and is drawn in a straight line when cultivating and planting, but when it is desired to steer the machine around a row or to turn the machine around to bring it back in parallel with the operation just completed the lever 11 is operated, raising the bar 10 and the wheels 9 from contact with the ground and as the steering lever 15 is disposed in operable relation with the operator's seat 12, the said steering lever 15 is operated. The lever 15 is provided with a steering head or rod 14, which inclines rearwardly and is journaled in the central longitudinal bar 1ª, and whose lower end is rigidly attached to the yoke 15', which carries at its lower end a steering or guiding wheel 16. By this means any movement of the steering lever 15 to right or left will turn the wheel 16 and thereby provide a steering means for the machine when the wheels 9 are out of contact with the ground.

In order to normally hold the wheel 16 out of contact with the ground, as clearly shown in Figs. 2 and 3, a coil spring 18 surrounds the shank of shaft 14 between the main frame of the machine and the under side of the collar 17, which is made fast to the standard or steering post 14, thereby exerting a tension upwardly and holding said steering post or standard upwardly and consequently the wheel 16 out of contact with the ground. In order to operate said wheel 16 so that it will contact with the ground, it is necessary that the steering post or standard 14 be moved downwardly, thereby carrying the wheel 16. This is accomplished by means of the curved treadle 19 which is at its forward end pivoted to the main frame and has its foot treadle end extended beyond the steering post or standard 14, so that any movement of the foot treadle 19 downwardly, said foot treadle 19 being slidably connected to the collar 17 of the standard 14, will depress the spring and carry with the collar 17 the steering post or standard 14, the guiding wheel 16 being then placed in engagement with the ground. It is therefore evident that to steer the machine it is simply necessary to press the foot treadle or lever downwardly, bringing the wheel 16 into contact with the ground and while holding the same in such position, the lever or steering rod 15 may be turned in the desired direction. When the machine is to be driven in a straight path the foot lever is released, the spring 18 thereby returning the wheel to the position as shown in Figs. 2 and 3.

In order to properly support the steering post or standard 14 at its upper end a guide 13 is provided.

From the foregoing description taken in connection with the drawings it is evident that this attachment may be applied to various forms of cultivators or planters and combined cultivators and planters and that the said cultivators or planters may be provided with rigidly journaled wheels which will permit the machine to be pulled steadily in a straight path, this device being attached so that when the machine is moved from place to place or is turning about at the end of a row, the steering or turning of the machine will be facilitated.

What is claimed is:—

1. The combination with an agricultural implement, having four wheels supporting the forward end thereof and at all times in parallel, and means for raising and lowering the wheels simultaneously, of a steering device therefor and disposed between the supporting wheels, said steering device comprising a steering standard pivotally mounted in said machine, a steering lever for manipulating the same, a steering wheel journaled at the lower end of said standard, a spring upon the standard for normally holding the wheel out of contact with the ground, and a pivotally mounted foot treadle engaging the rod for depressing the spring and placing the wheel in contact with the ground.

2. The combination with an agricultural implement provided with two pairs of wheels journaled for only parallel movement, and means for raising and lowering all of said wheels simultaneously, of a steering device for the machine disposed between said pairs of wheels, and comprising a shaft or steering head, a lever mounted at the upper end thereof, a steering wheel rotatably journaled in the lower end thereof, whereby the shaft may be turned in transverse direction, a guide for the standard connected to the standard above the machine, a spring interposed between the machine and said guide, for holding the standard and wheel upwardly, and a foot treadle for depressing the standard and wheel.

In testimony that I claim the foregoing as my own, I have hereto affixed my signature in the presence of two witnesses.

GEORGE ROSEMAN.

Witnesses:
FRED G. ST. JOHN,
JOHN MENNES.

---

Copies of this patent may be obtained for five cents each, by addressing the "Commissioner of Patents, Washington, D. C."